US012726958B2

(12) United States Patent
Sandberg et al.

(10) Patent No.: US 12,726,958 B2
(45) Date of Patent: Sep. 1, 2026

(54) DISTRIBUTED MITIGATION OF INTERFERENCE IN RADIO ACCESS NETWORKS

(71) Applicant: Outdoor Wireless Networks LLC, Richardson, TX (US)

(72) Inventors: Stuart D. Sandberg, Acton, MA (US); Arthur J. Barabell, Sudbury, MA (US)

(73) Assignee: Outdoor Wireless Networks LLC, Richardson, TX (US)

( * ) Notice: Subject to any disclaimer, the term of this patent is extended or adjusted under 35 U.S.C. 154(b) by 266 days.

(21) Appl. No.: 18/584,033

(22) Filed: Feb. 22, 2024

(65) Prior Publication Data

US 2024/0292386 A1 Aug. 29, 2024

Related U.S. Application Data

(60) Provisional application No. 63/486,916, filed on Feb. 24, 2023.

(51) Int. Cl.

*H04W 72/0446* (2023.01)
*H04L 5/00* (2006.01)
*H04W 72/12* (2023.01)
*H04W 74/0833* (2024.01)

(52) U.S. Cl.

CPC ....... *H04W 72/0446* (2013.01); *H04L 5/0051* (2013.01); *H04W 72/12* (2013.01); *H04W 74/0833* (2013.01)

(58) Field of Classification Search

CPC . H04W 28/16; H04W 24/02; H04W 72/0446; H04W 72/12; H04W 72/23; H04W 74/0833; H04W 72/0453; H04W 88/085; H04W 52/143; H04W 52/243; H04L 5/0051

See application file for complete search history.

(56) References Cited

U.S. PATENT DOCUMENTS 9,380,466 B2 6/2016 Eyuboglu et al.
9,414,399 B2 8/2016 Eyuboglu et al.
9,936,470 B2 4/2018 Eyuboglu et al.

(Continued)

FOREIGN PATENT DOCUMENTS

EP 3269118 A2 1/2018
WO 2016145371 A2 9/2016

(Continued)

*Primary Examiner* — Quoc Thai N Vu
(74) *Attorney, Agent, or Firm* — Fogg & Powers LLC

(57) ABSTRACT

One embodiment is directed to a system comprising a distributed unit comprising a plurality of processing units (PUs) and a plurality of radio units (RUs). Each PU is configured to: for each time slot included in a first subset of the time slots, independently perform scheduling for at least one shared channel for only those UEs for which the respective protection zone (PZ) span only RU groups (RUGs) included in a first one of a respective pair of RUG Groups associated with that PU, and, for each time slot included in a second subset of the time slots, independently perform scheduling for the at least one shared channel for only those UEs for which the respective PZs span only the RUGs included in a second one of the respective pair of RUG Groups associated with that PU. Other embodiments are directed to scheduling support channel resources.

30 Claims, 7 Drawing Sheets

(56) References Cited

U.S. PATENT DOCUMENTS

| | | | |
|---|---|---|---|
| 9,998,310 | B2 | 6/2018 | Barbieri et al. |
| 10,057,916 | B2 | 8/2018 | Barabell et al. |
| 10,097,391 | B2 | 10/2018 | Fertonani et al. |
| 10,355,895 | B2 | 7/2019 | Barbieri et al. |
| 10,405,344 | B2 | 9/2019 | Shanmugaraju et al. |
| 2012/0275496 | A1* | 11/2012 | Haghighat ............ H04L 1/0606 375/295 |
| 2017/0006584 | A1* | 1/2017 | Ren ..................... H04W 72/542 |
| 2017/0373890 | A1 | 12/2017 | Fertonani et al. |
| 2018/0287696 | A1 | 10/2018 | Barbieri et al. |
| 2019/0007246 | A1 | 1/2019 | Fertonani et al. |
| 2019/0116568 | A1 | 4/2019 | Fertonani et al. |
| 2019/0208575 | A1 | 7/2019 | Barbieri et al. |
| 2020/0154412 | A1* | 5/2020 | Lee ....................... H04W 72/23 |
| 2024/0022927 | A1* | 1/2024 | Tong ....................... H04W 4/40 |
| 2024/0049190 | A1* | 2/2024 | Hosseini ................. H04L 5/001 |

FOREIGN PATENT DOCUMENTS

| | | | |
|---|---|---|---|
| WO | 2017070635 | A1 | 4/2017 |
| WO | 2018017468 | A1 | 1/2018 |

* cited by examiner

SU n
SU n+1
PU n
112
114
RUG GROUP A
RUG GROUP B
RUG 2n-1
RUG 2n
RUG 2n+1
PZ A
PZ B
PZ C
PZ D
PZ E
PZ F
PZ G
PZ H
A
B
C
D
E
F
G
H
104
110
118
128
130

SU n
SU n+1
PU n
112
114
104
118
110
128
130
130
RUG GROUP A
RUG GROUP B
RUG 2n-1
RUG 2n
RUG 2n+1
PZ A
PZ B
PZ C
PZ D
PZ E
PZ F
PZ G
PZ I
A
B
C
D
E
F
G
I

DISTRIBUTED MITIGATION OF INTERFERENCE IN RADIO ACCESS NETWORKS

CROSS-REFERENCE TO RELATED APPLICATIONS

This application claims the benefit of U.S. Provisional Patent Application Ser. No. 63/486,916, filed on Feb. 24, 2023, which is hereby incorporated herein by reference in its entirety.

BACKGROUND

In conventional cellular radio access networks (RANs), user equipment (UE) throughput is degraded when the pathloss to the base station serving that UE has a level similar to the pathloss to a neighboring base station. The degraded throughput is a consequence of the higher inter-cell interference in such "border" regions, as well as the lower receive signal power relative to locations closer to the serving base station. If the UE moves toward the neighboring base station, eventually the UE's connection will be handed over to the neighboring base station, where the UE will continue to experience degraded throughput in the border region.

One type of RAN is a centralized or cloud radio access network (C-RAN) in which, for each cell (that is, for each physical cell identifier (PCI)) served by the C-RAN, a single distributed unit (DU) entity interacts with multiple radio units (RUs) (also referred to here as "radio points" or "RPs") in order to provide wireless service to various UEs. The DU entity may also be referred to as a "baseband unit" (BBU) or a "baseband controller." The multiple radio units are typically located remotely from each other (that is, the multiple radio units are not co-located). The DU is communicatively coupled to the radio units over a fronthaul network.

For UEs located in the regions approximately midway between multiple RUs, interference that would otherwise result from simultaneously communicating with different UEs using different RUs can be significantly reduced by jointly scheduling such simultaneous communications with different UEs using different subsets of RUs in order to avoid such interference. This is referred to as "reuse" since the same physical resource blocks (PRBs) are used ("re-used") to simultaneously communicate with different UEs using different sets of different RUs. More specifically, the DU is configured to employ such reuse for two or more UEs only in those situations where the UEs are sufficiently physically separated from one another (or there is otherwise sufficient radio frequency (RF) isolation) to avoid significant co-channel interference resulting from the simultaneous communications. Also, transmitting from multiple RUs to a single UE, and combining uplink data received from a single UE using multiple RUs, can effectively boost the signal power.

For a C-RAN, the number of RUs used to serve a cell tends to increase linearly with the deployment area, while the computational capacity for the DU is generally fixed. Furthermore, those C-RANs that support reuse typically only do so for communication of user data and do not support reuse for support channels (such as, for example, Sounding Reference Signal (SRS) and the physical uplink control channel (PUCCH)). As a result, such C-RANs experience a cap, independent of the number of RUs served, on the number of support channel resources and number of connected UEs that can be supported for a given cell. Hence, for deployments where a large area is to be served and/or where there is high user density, multiple cells typically must be deployed using such C-RANs, and throughput degradation in the border regions between such cells may still be present.

SUMMARY

One embodiment is directed to a system comprising a distributed unit (DU) comprising a plurality of processing units (PUs) and a plurality of radio units (RUs) to wirelessly transmit and receive radio frequency signals to and from a plurality of user equipment (UEs) using a wireless interface. The wireless interface uses a plurality of time slots. Each of the RUs is associated with a respective set of antennas. The PUs are communicatively coupled to the plurality of RUs over a fronthaul network. Each of the RUs is assigned to one of a plurality of RU groups (RUGs) for the purposes of scheduling at least one shared channel. The system is configured to determine a respective protection zone (PZ) for each UE. The respective protection zone for each UE comprises a respective signal zone (SZ) comprising a respective first subset of the RUs used to wirelessly communicate with that UE using the at least one shared channel. The respective PZ for each UE further comprises a respective second subset of the remote units that are not used to wirelessly communicate with any other UE using the at least one shared channel while the RUs in the respective SZ for that UE are being used to wirelessly communicate with that UE using the at least one shared channel. The respective PZ associated with each UE spans each RUG having at least one RU that is included in that PZ. Each PU is associated with a respective pair of overlapping groupings of RUGs (RUG Groups). The RUs are deployed and assigned to the RUGs so that: the respective PZ determined for each UE cannot span more than two RUGs; the respective no more than two RUGs spanned by each UE are collectively associated with no more than two PUs; a respective intersection of the respective pair of RUG Groups associated with each PU includes at least one RUG; each of the respective pair of RUG Groups associated with each PU includes at least one RUG that is not in the respective intersection of the respective pair of RUG Groups associated with that PU; and each RUG that is not in the respective intersection of the respective pair of RUG Groups associated with each PU is included in one of the respective pair of RUG Groups associated with a neighbor PU of that PU and is not included in the respective intersection of the respective pair of RUG Groups associated with that neighbor PU. Each PU is configured to: for each time slot included in a first subset of the time slots, independently perform scheduling for the at least one shared channel for only those UEs for which the respective PZs span only the RUGs included in a first one of the respective pair of RUG Groups associated with that PU; for each time slot included in a second subset of the time slots, independently perform scheduling for the at least one shared channel for only those UEs for which the respective PZs span only the RUGs included in a second one of the respective pair of RUG Groups associated with that PU; and for each time slot, serve each UE allocated resources to the at least one shared channel for that time slot by that PU. The techniques described here can be extended to two or three dimensions (for example, with a square or cube layout of RUGs) in a straightforward manner.

Another embodiment is directed to a system comprising a distributed unit (DU) comprising a plurality of processing units (PUs) and a plurality of radio units (RUs) to wirelessly transmit and receive radio frequency signals to and from a plurality of user equipment (UEs) using a wireless interface. The wireless interface uses a plurality of time slots. Each of the RUs is associated with a respective set of antennas. The PUs are communicatively coupled to the plurality of RUs over a fronthaul network. Support channel resources (SCR) provided by the at least one support channel of the wireless interface are divided into two SCR subsets. Each of the RUs is assigned to one of a plurality of SCR RU groups (RUGs) for the purposes of scheduling the at least one support channel. Each UE comprises a respective primary SCR RUG spanned by that UE. The respective primary SCR RUG for each UE comprises the SCR RUG that includes the RU having a highest signal reception associated with that UE. Each SCR RUG is associated with at least one of the SCR subsets. Each UE is assigned a respective one of the SCR subsets as a function of the respective primary SCR RUG for that UE. The system is configured so that when any UE is scheduled to use any SCR included in a first one of the SCR subsets there is a minimum number of neighboring SCR RUGs between the respective primary SCR RUG of that UE and any other SCR RUG associated with said first one of the SCR subsets. The techniques described here can be extended to two or three dimensions (for example, with a square or cube layout of SCR RUGs) in a straightforward manner.

Other embodiments are disclosed.

The details of various embodiments are set forth in the accompanying drawings and the description below. Other features and advantages will become apparent from the description, the drawings, and the claims.

BRIEF DESCRIPTION OF DRAWINGS

Like reference numbers and designations in the various drawings indicate like elements.

DETAILED DESCRIPTION

Figure 1:
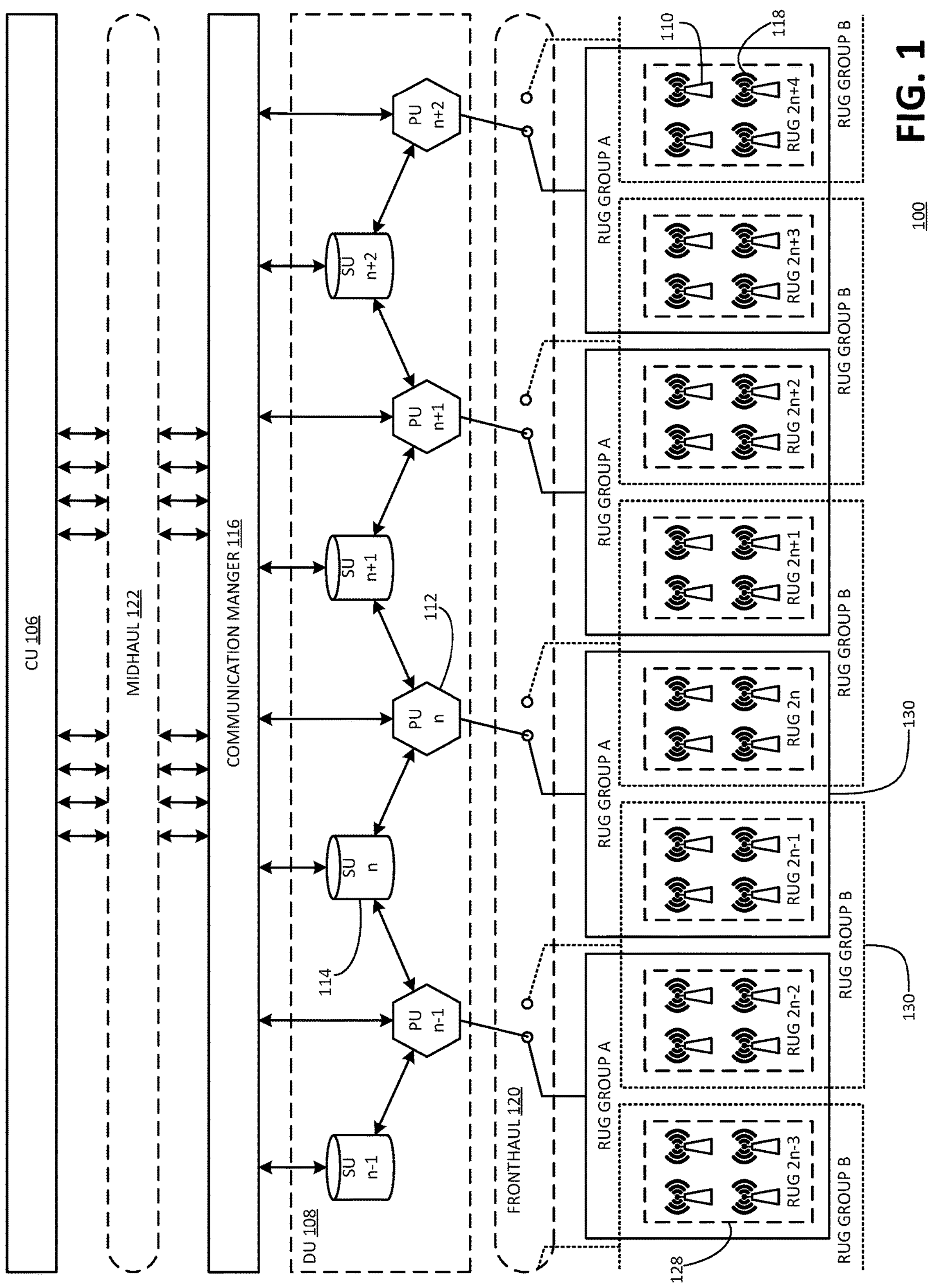
FIG. 1 is a block diagram illustrating one exemplary embodiment of a radio access network (RAN) system in which the techniques described below can be used.

FIG. 1 is a block diagram illustrating one exemplary embodiment of a radio access network (RAN) system 100 in which the techniques described below can be used. The RAN system 100 shown in FIG. 1 implements a base station entity for serving each cell. The RAN system 100 can also be referred to here as a "base station" or "base station system" (and, which in the context of a fourth generation (4G) Long Term Evolution (LTE) system, may also be referred to as an "evolved NodeB" or "eNodeB" and, in the context of a fifth generation (5G) New Radio (NR) system, may also be referred to as a "gNodeB"). In general, the base station 100 is configured to provide wireless service to various items of user equipment (UEs) 104 (not shown in FIG. 1) served by the cell. Unless explicitly stated to the contrary, references to Layer 1, Layer 2, Layer 3, and other or equivalent layers (such as the Physical Layer or the Media Access Control (MAC) Layer) refer to the particular wireless interface (for example, 4G LTE or 5G NR) used for wirelessly communicating with UEs 104 served by the cell.

In the exemplary embodiment shown in FIG. 1, for each cell, the associated base station 100 is partitioned into a central unit (CU) 106, one or more distributed units (DUs) 108, and multiple radio units (RUs) 110.

In this embodiment, the DU 108 comprises multiple processor units (PUs) 112, multiple storage units (SUs) 114, and at least one communication manager 116. Each RU 110 includes or is coupled to a respective set of one or more antennas 118 (only one of which is shown for ease of illustration) via which downlink RF signals are radiated to UEs 104 and via which uplink RF signals transmitted by UEs 104 are received. In the exemplary embodiment shown in FIG. 1, the PUs 112, SUs 114, and communication manager 116 are used to implement the associated DU entity for the base station 100. In this embodiment, the CU 106 implements the control-plane and user-plane Layer-3 functions for the base station 100, and the DU 108 implements the Layer-2 functions as well as some of the control-plane and user-plane Layer-1 functions (also referred to here as the "upper" or "high" Layer-1 functions).

In this embodiment, each RU 110 is configured to implement, for the UEs 104 served by that RU 110, the control-plane and user-plane Layer-1 functions not implemented by the DU 108 (also referred to here as the "lower" or "low" Layer-1 functions) as well as the radio frequency (RF) functions. Other embodiments can be implemented in other ways.

In one implementation (shown in FIG. 1), each RU 110 is remotely located from each DU 108 serving it. Also, in such an implementation, at least one of the RUs 110 is remotely located from at least one other RU 110 serving the associated cell. In another implementation, at least some of the RUs 110 are co-located with each other, where the respective sets of antennas 118 associated with the RUs 110 are directed to transmit and receive signals to and from different areas.

The RUs 110 are communicatively coupled to the DU 108 (more specifically, to the PUs 112 used to implement the DU 108) via a fronthaul network 120 (for example, using a switched Ethernet network and the Internet Protocol (IP)). The DU 108 is coupled to the CU 106 via a network 122 (also referred to here as a "midhaul" network 122). The CU 106 is coupled to a core network (not shown) of the associated wireless network operator over an appropriate backhaul (not shown) (such as the Internet). The physical nodes on which the PUs 112 are implemented include suitable network interfaces to couple those nodes to the fronthaul network 120 in order to facilitate communications between the PUs 112 and the RUs 110. The one or more physical nodes on which the communication manager 116 is implemented include suitable network interfaces to couple those nodes to the midhaul network 122 in order to facilitate communications between the CU 106 and the DU 108. The one or more physical nodes on which the CU 106 is implemented include suitable network interfaces to couple those nodes to the backhaul in order to facilitate communications between the base station 100 and the core network.

Each CU 106, DU 108, RU 110, PU 112, SU 114, and communication manager 116, any of the specific features described here as being implemented thereby, can be implemented in hardware, software, or combinations of hardware and software, and the various implementations (whether hardware, software, or combinations of hardware and software) can also be referred to generally as "circuitry," a "circuit," or "circuits" that is or are configured to implement at least some of the associated functionality. When implemented in software, such software can be implemented in software or firmware executing on one or more suitable programmable processors (or other programmable device) or configuring a programmable device (for example, processors or devices included in or used to implement special-purpose hardware, general-purpose hardware, and/or a virtual platform). In such a software example, the software can comprise program instructions that are stored (or otherwise embodied) on or in an appropriate non-transitory storage medium or media (such as flash or other non-volatile memory, magnetic disc drives, and/or optical disc drives) from which at least a portion of the program instructions are read by the programmable processor or device for execution thereby (and/or for otherwise configuring such processor or device) in order for the processor or device to perform one or more functions described here as being implemented the software. Such hardware or software (or portions thereof) can be implemented in other ways (for example, in an application specific integrated circuit (ASIC), etc.).

Moreover, each CU 106, DU 108, RU 110, PU 112, SU 114, and communication manager 116 can be implemented as a physical function (PF) (for example, using dedicated physical programmable devices and other circuitry) and/or a virtual function (VF) (for example, using one or more general purpose servers (possibly with hardware acceleration) in a scalable cloud environment) and in different locations within an operator's network (for example, in the operator's "edge cloud" or "central cloud").

For example, in the exemplary embodiment shown in FIG. 1, each RU 110 is implemented as a PF and is deployed in or near a physical location where radio coverage is to be provided and each CU 106 and DU 108 (and the PU 112, SU 114, and communication manager 116) is implemented as a virtual function (VF) and is deployed in a distributed manner, with, for example, the CU 106 implemented in an operator's central cloud and the DU 108 ((and the PU 112, SU 114, and communication manager 116) in an edge cloud. Collectively, the PUs 112, SUs 114, and communication manager 116 implement the functionality for the DU 108. Suitable communication connectivity is provided between each PU 112 and each SU 114, other PU 112, and communication manager 116 to which that PU 112 needs access. For example, where a given PU 112 is implemented on the same physical node as a SU 114, other PU 112, or communication manager 116 that given PU 112 needs access to, this access can be provided without resort to an external physical network (for example, via Inter Process Communication (IPC), via localhost and port numbers, or via an underlying virtualization system used to instantiate that given PU 112 and SU 114, other PU 112, or communication manager 116 on the same physical node). Where a given PU 112 is implemented on a different physical node as a SU 114, other PU 112, or communication manager 116 that given PU 112 needs access to, this access can be provided by a network such as the fronthaul network 120, the midhaul network 122, or another network implemented as a part of the edge cloud in which the DU 108 (including the PUs 112, SUs 114, and communication manager 116) are deployed. The physical nodes on which the PUs 112, SUs 114, and communication manager 116 are implemented include suitable network interfaces to couple those nodes to such a network in order to facilitate communications between the PUs 112, and between the PUs 112 and the SUs 114 and communication manager 116.

Each CU 106, DU 108, RU 110, PU 112, SU 114, and communication manager 116, and any of the specific features described here as being implemented thereby, can be implemented in other ways.

Each base station 100 is configured to wirelessly communicate with each UE 104 served by the base station 100 using a respective subset of the RUs 110 serving that cell. This respective subset of RUs 110 for each UE 104 is also referred to here as the "signal zone" (SZ) for that UE 104. That is, downlink data is wirelessly transmitted to a given UE 104 by wirelessly transmitting that downlink data from the RUs 110 included in that UE's signal zone, and uplink data is wirelessly received from a given UE 104 by combining data received at the RUs 110 included in that UE's signal zone. The SZ used for transmitting data to a UE 104 may be different from the SZ used for receiving data from the UE 104. However, in the following description, for ease of explanation, it is assumed that the SZ used for transmitting data to a UE 104 is the same as the SZ used for receiving data from that UE 104.

The signal zone can vary from UE-to-UE and a given UE's signal zone can change as the UE 104 moves throughout the coverage area associated with the cell. The "size" of a signal zone refers to the number of radio units 110 that are included in that signal zone. In general, the signal zone for a UE 104 includes those radio units 110 that have the "best" or "strongest" signal reception characteristics for that UE 104, assuming those radio units 110 have sufficient capacity.

In one exemplary embodiment, the signal zone for each UE 104 can be determined by the DU 108 using a "signature vector" (SV) associated with that UE 104. Each element of the signature vector corresponds to one of the radio units 110 used to serve the cell and comprises one or more numerical values associated with the signal transmission or reception characteristics for that UE 104.

The elements of the signature vector for each UE 104 can be determined based on uplink transmissions from the UE 104. Such an approach is based on the assumption that the relative signal reception metrics determined using such uplink transmissions are representative of which radio units 110 the UE 104 will have the best or strongest signal reception characteristics for downlink transmissions made from those radio units 110 and are sufficiently representative for the purpose of determining the signal zone for the UE 104. For example, the signature vector can be determined based on received power measurements made at each of the radio units 110 serving the cell 102 for one or more uplink transmissions from the UE 104 (for example, Physical Random Access Channel (PRACH) and Sounding Reference Signals (SRS) transmissions). More specifically, each radio unit 110 serving the cell will receive those uplink transmissions and can measure or otherwise determine a signal reception metric indicative of the power level of the transmissions received by that radio unit 110 from the UE 104. One example of such a signal reception metric is a signal-to-noise plus interference ratio (SNIR). The signature vector can be updated over the course of a UE's connection to the cell (for example, based on SRS transmissions from the UE 104.

One way that the respective signature vector determined for a given UE 104 can be used to determine the respective signal zone for that UE 104 is by using the signature vector to calculate a "total SZ power" and a "total available power" for that UE 104. The total SZ power for a given UE 104 is the sum of the respective signal reception metrics determined for that UE 104 corresponding to the radio units 110 that are currently included in the signal zone of that UE 104. The "total available power" for the UE 104 is the sum of the signal reception metrics determined for that UE 104 that correspond to all of the radio units 110 used to serve the cell. The signal zone for a UE 104 can be determined by including enough radio units 110 in the signal zone for the UE 104 so that the total SZ power for the UE 104 is within a threshold amount of the total available power for the UE 104. More specially, a respective signal zone for a UE 104 can be determined by starting with an empty signal zone for that UE 104, sorting the radio units 110 based on the respective corresponding signal reception metrics determined for that UE 104 in descending order from strongest power to weakest power, and adding, to the signal zone for that UE 104, successive radio units 110 (according to the resulting sorted descending order) until the total SZ power calculated for that UE 104 is within a threshold amount of the respective total available power calculated for that UE 104 or until the number of radio units 110 included in the respective signal zone for that UE 104 is equal to a predetermined maximum value (also referred to here as the "signal zone cap" $|SZ|_{cap}$). That is, the size of the signal zone is limited to the signal zone cap $|SZ|_{cap}$.

The base station 100 is configured to support frequency reuse. "Frequency reuse" refers to situations where separate data (including, user data, control data, reference signals, etc.) intended for different UEs 104 is simultaneously wirelessly transmitted to the UEs 104 using the same physical resource blocks (PRBs) for the same cell but using different RUs 110. Such reuse UEs 104 are also referred to here as being "in reuse" with each other. For those PRBs where frequency reuse is used, each of the multiple reuse UEs 104 is served by a different subset of the RUs 110, where no RU 110 is used to serve more than one UE 104 for those reused PRBs.

The benefit to a given UE 104 for a relatively large signal zone is captured mainly in the greater protection it offers in preventing the radio units 110 included in the signal zone for that given UE 104 from being used to wirelessly communicate with one or more other UEs 104 that are in reuse with that given UE 104. The additional benefit of relatively greater signal power for a given UE 104 is generally less significant in comparison to the reduction in interference resulting from preventing the radio units 110 included in the signal zone for that given UE 104 from being used to wirelessly communicate with other UEs 104. Therefore, to significantly mitigate the loss of spectral efficiency to a UE 104 from capping the size of the signal zone, a "protection zone" (PZ) can be defined and used for each UE 104.

The protection zone for a given UE 104 contains the radio units 110 that are in the signal zone of that UE 104 as well as other radio units 110 having relatively good or strong signal reception characteristics for that UE 104 (which, for example, can be determined using the signature vector for the UE 104). That is, the protection zone for a given UE 104 includes those radio units 110 to which the UE 104 would have relatively high interference sensitivity if those radio units were used to transmit to a different UE 104. Or, stated another way, the PZ for a UE 104 contains just enough RUs 110 that the sum interference power received from the RUs 110 not in that UE's PZ is insignificant in comparison with the signal power that the UE 104 receives from RUs 110 in its SZ.

The protection zone for a given UE 104 is used during scheduling to prevent transmissions to any other UEs 104 in reuse with that given UE 104 using any radio units 110 included in the protection zone of that given UE 104. A predetermined maximum value (referred to here as the "protection zone cap" $|PZ|_{cap}$) can be imposed on the size of each UE's protection zone. Limiting the size of each UE's protection zone to the $|PZ|_{cap}$ is one way to limit the impact of the use of protection zones on the number of the opportunities in which downlink frequency reuse can be employed.

The respective signature vector for a given UE 104 can be used to determine the protection zone for each UE 104. Each UE 104 has an associated respective "remaining available power" that can be calculated by summing the signal reception metrics determined for that UE 104 corresponding to the radio units 110 not already included in the protection zone for that UE 104. The radio units 110 can be sorted based on the respective corresponding signal reception metrics included in the signature vector of that UE 104 in descending order from strongest power to weakest power. Then, starting with an empty protection zone, the radio units 110 included in the simulcast zone for that UE 104 can be added to the protection zone and, from the remaining radio units 110 not included in the protection zone, successive radio units 110 can be added to the protection zone in the descending order until the ratio of the respective total simulcast zone power for the UE 104 and the respective remaining available power for the UE 104 exceeds a predetermined threshold value (referred to here as the "signal-to-interference (SIR) threshold") or until the total number of radio units 110 included in the respective protection zone for that UE 104 equals the protection zone cap $|PZ|_{cap}$. In one implementation, the SIR threshold corresponds to a value that identifies radio units 110 to which the UE 104 would have relatively high interference sensitivity if used for wirelessly transmitting to a different UE 104.

The signal zones and protection zones for the various UEs 104 served by the cell can be used in determining which UEs 104 are candidates for being put into reuse for the shared channels (that is, the physical downlink shared channel (PDSCH) and physical uplink shared channels (PUSCH)) with each other. A group of UEs 104 can be put in reuse for the shared channels if the SZ for none the UEs 104 included in that group "overlaps" with the PZ for any of the other UEs 104 included in that group. A UE's SZ overlaps with a PZ for another UE 104 if the SZ and the PZ include at least one common RU 110, and a UE's SZ does not overlap with a PZ for another UE 104 if the SZ and the PZ do not include any common RUs 110. Typically, these situations arise where the reuse UEs 104 are sufficiently physically separated from each other so that the co-channel interference resulting from the different wireless transmissions is sufficiently low (that is, where there is sufficient RF isolation).

The scheduling of the shared channels for (for example, the Physical Downlink Shared Channel (PDSCH) and the Physical Uplink Shared Channel (PUSCH)), and the provision of other services to (for example, the determination of the PZs and SZs), for the various UEs 104 served by a base station 100 is performed in a distributed manner by the various PUs 112 of the DU 108.

Doing this avoids the capacity limitations resulting from using a single entity to serve a large number of RUs 110 and UEs 104. However, as noted in the Background section, when different coverage areas are scheduled independently by different entities, interference may result in the border areas between different coverage areas. In theory, this issue could be addressed by having each entity doing the shared-channel scheduling (that is, each PU 112 in this example) consider the SZs and PZs of any neighboring UEs 104 scheduled by another PU 112. However, this would likely result in a complex cascaded scheduling process involving significant coordination between PUs 112.

In the embodiments described here, the scheduling of the shared channels for, and the provision of other services to, for the various UEs 104 served by the base station 100 is performed in a distributed manner by the various PUs 112 in a "border-free" manner in which interference in border areas between different groups of RUs 110 is avoided while also avoiding having to employ a complex cascaded scheduling process involving significant coordination between PUs 112.

The DU 108 is implemented using N number of PUs 112 and that same N number of SUs 114. As shown in FIG. 1, the base station 100 comprises M number of RUs 110. The RUs 110 are partitioned into 2N adjacent, non-intersecting groups of RUs 110, referred to as "RU groups" (RUGs) 128. Each PU 112 is assigned two different, intersecting (overlapping) groupings (subsets) of RUGs 128. To avoid confusion, these intersecting groups or subsets of RUGs 128 are also referred to here as "RUG Groups" 130.

In order to implement the distributed scheduling technique described below, the RUs 110 are arranged and assigned to RUGs 128 so that, for any location within the cell, the PZ determined for a UE 104 positioned at that location would not "span" more than two RUGs 128. As used here, a UE 104 "spans" any RUG 128 or RUG Group 130 that includes at least one RU 110 that is included in the PZ for that UE 104. One consequence of satisfying this condition is that the RUGs 128 spanned by each UE 104 will collectively be assigned to no more than two PUs 112. A UE 104 that spans only a single RUG 128 is also referred to here as a "inner" UE 104, whereas a UE 104 that spans two RUGs 128 is also referred to here as a "border" UE 104.

Also, the RUs 110 are arranged and assigned to RUGs 128 so that each RUG 128 is either an "intersecting" RUG 128 or a "non-intersecting" RUG 128. As used here, each "intersecting" RUG 128 is assigned to only a single PU 112 and is included in both RUG Groups 130 assigned to that PU 112. As used here, each "non-intersecting" RUG 128 is assigned to two neighboring PUs 112 and is included in only one of the two RUG Groups 130 assigned to each of the two neighboring PUs 112 to which that non-intersecting RUG 128 is assigned.

In some embodiments, the RUs 110 are deployed and assigned to RUGs 128 and RUG Groups 130 so that each of the respective pairs of RUG Groups 130 associated with each PU 112 comprises an N×N array of RUGs 128. For example, the RUs 110 can be deployed and assigned to RUGs 128 and RUG Groups 130 so that each of the respective pairs of RUG Groups 130 associated with each PU 112 comprises an 1×2 array of RUGs 128.

More specifically, for ease of illustration, a "wide" deployment layout is shown in FIG. 1 with a single row of RUGs 128 in which the RUGs 128, are laid out from left to right and are individually numbered from 0 to 2N−1, with only RUGs 2n−3, 2n−2, 2n−1, 2n, 2n+1, 2n+2, 2n+3, 2n+4 shown in FIG. 1. Likewise, the PUs 112 and SUs 114 are individually numbered from 0 to N−1, with only PUs n−1, n, n+1, and n+2 and SUs n−1, n, n+1, and n+2 shown in FIG. 1. It is to be understood, however, that other embodiments can be implemented in other ways (for example, where the RUs 110 are laid out with multiple rows of RUGs 128). In general, the techniques described here can be extended to two or three dimensions (for example, with a square or cube layout of RUGs 128) in a straightforward manner.

In the example shown in FIG. 1, each PU 112 is assigned two RUG Groups 130 with each of the two RUG Groups 130 including two RUGs 128. As a result, each PU 112 has three RUGs 128 assigned to it, one of which is an intersecting RUG 128 and two of which are non-intersecting RUGs 128. In the example shown in FIG. 2, the left RUG Group assigned to each PU 112 is individually labeled as "RUG Group A," and the right RUG Group assigned to each PU 112 is individually labeled as "RUG Group B."

In the example shown in FIG. 1, RUG Group A assigned to PU n−1 includes RUGs 2n−3 and 2n−2 and RUG Group B assigned to PU n−1 includes RUGs 2n−2 and 2n−1. RUG Group A assigned to PU n includes RUGs 2n−1 and 2n and RUG Group B assigned to PU n includes RUGs 2n and 2n+1. RUG Group A assigned to PU n+1 includes RUGs 2n+1 and 2n+2 and RUG Group B assigned to PU n+1 includes RUGs 2n+2 and 2n+3. RUG Group A assigned to PU n+2 includes RUGs 2n+3 and 2n+4 and RUG Group B assigned to PU n+2 includes RUGs 2n+4 and 2n+5 (which is not shown in FIG. 1). RUG 2n−3 is also included in RUG Group B assigned to PU n−2 (which is not shown in FIG. 1). In the example shown in FIG. 1, RUGs 2n−2, 2n, 2n+2, and 2n+4 are intersecting RUGs 128 and RUGs 2n−3, 2n−1, 2n+1, and 2n+3 are non-intersecting RUGS 128.

Figure 2:
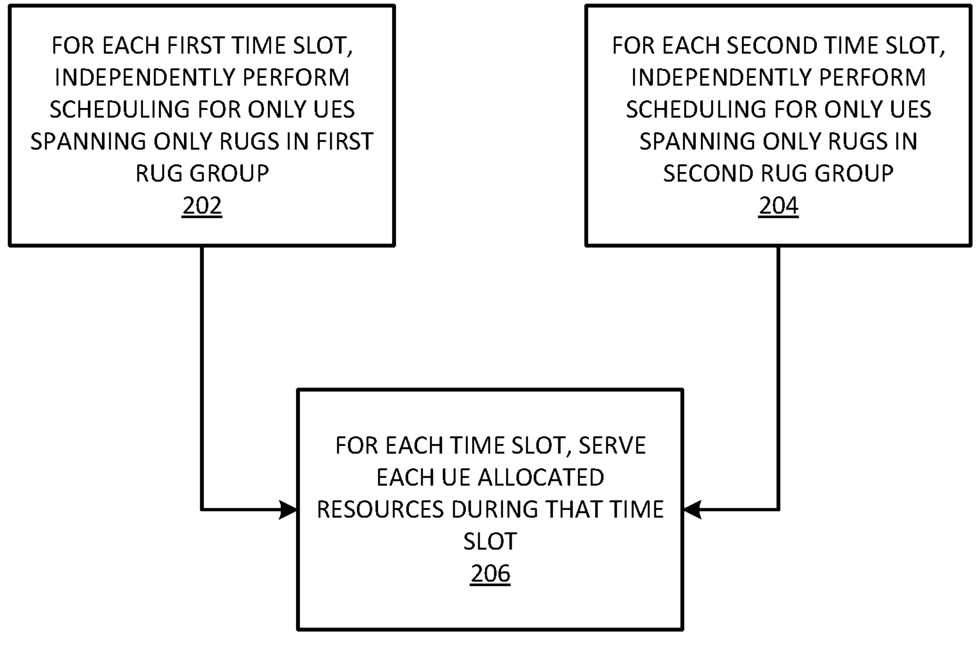
FIG. 2 comprises a high-level flowchart illustrating an exemplary embodiment of a method of providing wireless service using one or more shared channels of a wireless interface.

One way of providing wireless service using one or more shared channels of a wireless interface using the base station 100 of FIG. 1 is shown in FIG. 2.

FIG. 2 comprises a high-level flowchart illustrating an exemplary embodiment of a method 200 of providing wireless service using one or more shared channels of a wireless interface. The embodiment of method 200 shown in FIG. 2 is described here as being implemented using the base station 100 of FIG. 1. However, it is to be understood that other embodiments can be implemented in other ways.

The blocks of the flow diagram shown in FIG. 2 have been arranged in a generally sequential manner for ease of explanation; however, it is to be understood that this arrangement is merely exemplary, and it should be recognized that the processing associated with method 200 (and the blocks shown in FIG. 2) can occur in a different order (for example, where at least some of the processing associated with the blocks is performed in parallel and/or in an event-driven manner). Also, most standard exception handling is not described for ease of explanation; however, it is to be understood that method 200 can and typically would include such exception handling. Moreover, one or more aspects of method 200 can be configurable or adaptive (either manually or in an automated manner).

In the exemplary embodiment described here in connection with FIG. 2, method 200 is performed by each PU 112 independently of the other PUs 112 and is performed for the PDSCH and PUSCH. With method 200, the time slots defined for the wireless interface being scheduled are divided into two, non-intersecting subsets. For example, the time slots can be assigned to the two subsets by assigning every other time slot starting from a given time slot n to the first subset and assigning every other time slot starting from time slot n+1 to the second subset. As used here, time slots included in the first subset of time slots are also referred to here as "first time slots," and time slots included in the second subset of time slots are also referred to here as "second time slots."

Method 200, comprises, by each PU 112, independently performing scheduling of the shared channels for only those UEs 104 that span only the RUGs 128 included in the first RUG Group 130 assigned to that PU 112 for each first time slot (block 202) and independently performing scheduling of the shared channels for only those UEs 104 that span only the RUGs 128 included in the second RUG Group 130 assigned to that PU 112 for each second time slot (block 204).

As a part of the scheduling performed in blocks 202 and 204, any collection of UEs 104 being scheduling during a time slot can be considered for being served in reuse if the respective PZ of each UE 104 in that collection does not overlap with the respective PZ of any other UE 104 included in that collection.

Moreover, each PU 112 can be configured to independently assign different precoders to each RU 110 included in the respective SZ of each UE 104 included in a collection of UEs 104 being served in reuse so as to suppress interference at the other UEs 104 included the collection of UEs 104 being served in reuse. Global interference suppression techniques can be used (including, for example, the techniques described in U.S. Pat. No. 11,411,589, Ser. No. 16/586,922, and filed on Nov. 15, 2019, which is hereby incorporated herein by reference).

The scheduling of the shared channels performed in connection with blocks 202 and 204 is performed "independently" by each PU 112 in the sense that each PU 112 does not need to coordinate with other PUs 112 to perform that scheduling.

With method 200, each inner UE 104 should have a scheduling opportunity every time slot, whereas each border UE 104 should have a scheduling opportunity, on average, once every other time slot. Whether or not a UE 104 that is being scheduled for a shared channel for a given time slot is actually allocated any resources provided by that shared channel for use during the scheduled time slot depends on many factors and the UE 104 being scheduled may not actually be allocated any resources for use during the scheduled time slot.

Each PU 112 that allocates resources from a shared channel for a time slot to a UE 104 serves that UE 104 in connection with the use of the allocated resources (block 206). In connection with doing this, the PU 112 accesses the buffered user data and the context for that UE 104 in one of the SUs 114 assigned to the PU 112 (more details about this are provided below).

As a result of performing method 200, when a PU 112 performs the scheduling for a particular RUG Group 130, that PU 112 will not schedule or serve any border UE 104 that spans a RUG 128 that is not included the RUG Group 130 being scheduled by that PU 112 and, therefore, will not need to coordinate with another PU 112 in connection with doing so. As a result, multiple PUs 112 can be used to schedule and serve UEs 104 using the shared channels in a border-free manner, without complex coordination between the PUs 112.

Figure 3A:
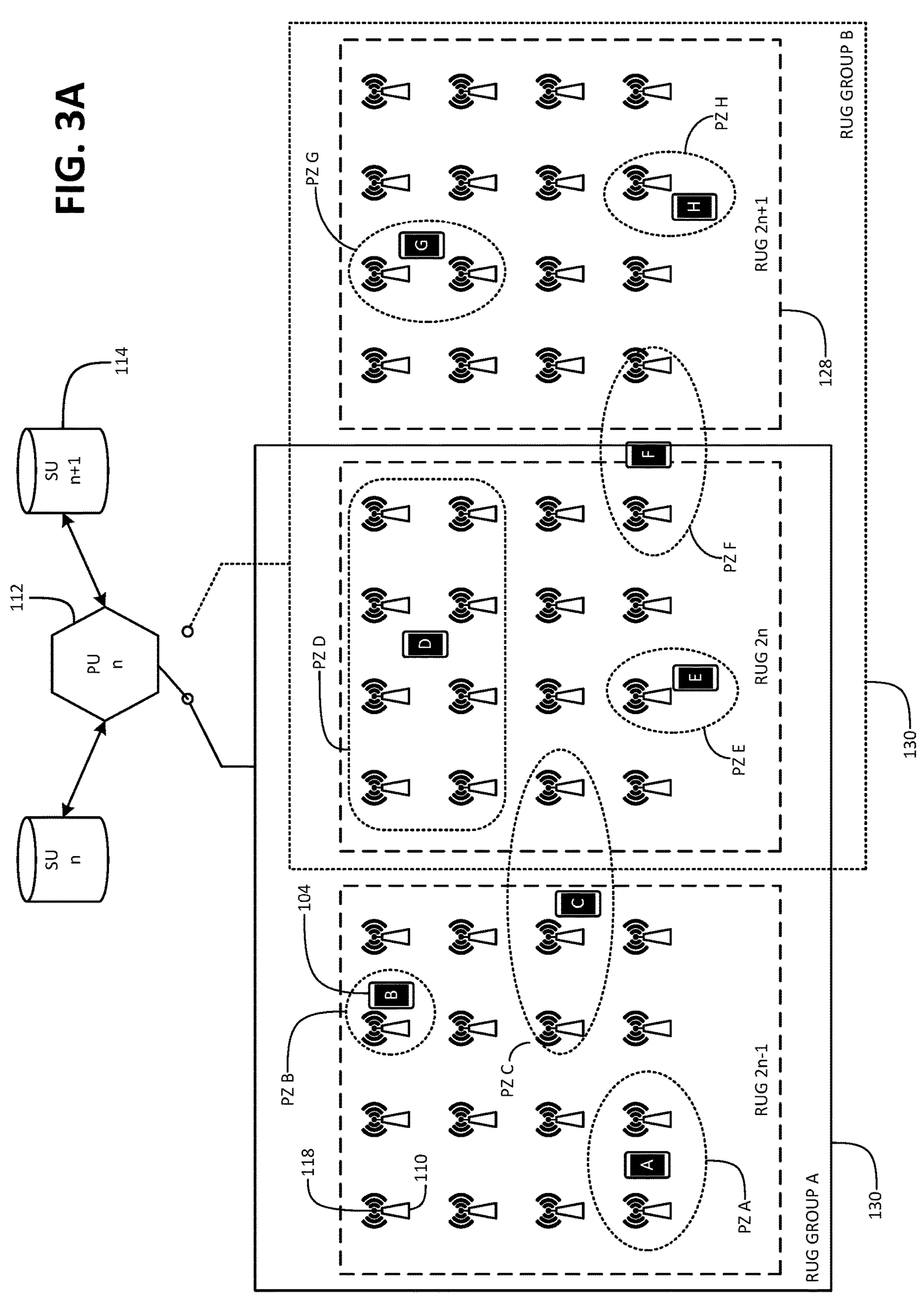
FIG. 3A illustrates one example of the operation of the method of FIG. 2 for a first time slot.
Figure 3B:
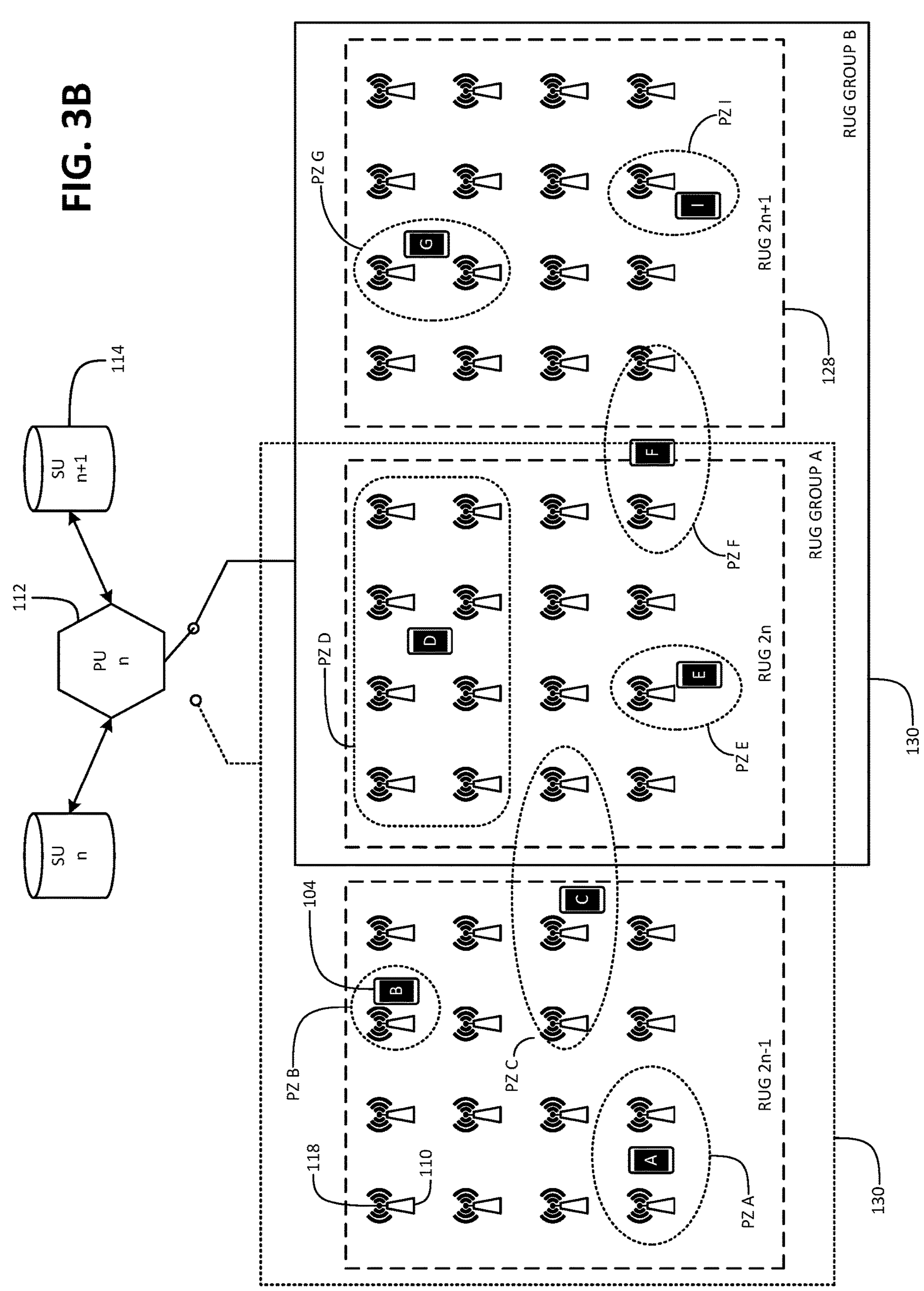
FIG. 3B illustrates one example of the operation of the method of FIG. 2 for a second time slot.

One example of the operation of method 200 is illustrated in connection with FIGS. 3A-3B. FIGS. 3A-3B are block diagrams illustrating a portion of the example base station 100 shown in FIG. 1. More specifically, in FIGS. 3A-3B, PU n and RUGs 2n−1, 2n, and 2n+1 (which are assigned to PU n) are shown.

In the example shown in FIGS. 3A-3B, eight UEs 104 are shown and are individually referenced as UEs A, B, C, D, E, F, G, H, and I, respectively. As shown in FIGS. 3A-3B, UE A spans only RUG 2n−1 (that is, the two RUs 110 in the PZ for UE A are included in only RUG 2n−1) and UE B spans only RUG 2n−1 (that is, the one RU 110 in the PZ for UE B is included in only RUG 2n−1). UE D spans only RUG 2n (that is, the eight RUs 110 in the PZ for UE D are included in only RUG 2n) and UE E spans only RUG 2n (that is, the one RU 110 in the PZ for UE D is included in only RUG 2n). UE G spans only RUG 2n+1 (that is, the two RUs 110 in the PZ for UE G are included in only RUG 2n+1) and UE H spans only RUG 2n+1 (that is, the one RU 110 in the PZ for UE I is included in only RUG 2n+1). Therefore, UEs A, B, D, E, G, and H are inner UEs 104.

UE C spans both RUGs 2n−1 and 2n (that is, two RUs 110 in the PZ for UE C are included in RUG 2n−1 and one RU 110 in the PZ for UE C are included in RUG 2n) and UE F spans both RUGs 2n and 2n+1 (that is, one RU 110 in the PZ for UE F is included in RUG 2n and one RU 110 in the PZ for UE F is included in RUG 2n+1). Therefore, UEs C and F are border UEs 104.

FIG. 3A illustrates one example of the operation of method 200 for a first time slot. In the example shown in FIG. 3A, for the first time slot, PU n performs scheduling of the shared channels for only those UEs 104 that span only the RUGs 2n−1 and 2n included in the RUG Group A for PU n. In connection with doing this, PU n retrieves the buffered user data and UE context for the scheduled UEs 104 from SU n and SU n−1. As shown in FIG. 3A, for the first time slot, only UEs A, B, C, D, and E span only the RUGs 2n−1 and 2n included in RUG Group A. For the first time slot, PU n schedules border UE C because border UE C spans only those RUGs 2n−1 and 2n included in the RUG Group A but PU n does not schedule border UE F because border UE F spans both RUG 2n and RUG 2n+1, the latter of which is not included in RUG Group A. For the first time slot, the PU n also considers as candidates for being served in reuse any collection of UEs A, B, C, D, and E since the respective PZ of each UE A, B, C, D, and E does not overlap with the respective PZ of any of the other UEs A, B, C, D, and E.

FIG. 3B illustrates one example of the operation of method 200 for a second time slot. In the example shown in FIG. 3B, for the second time slot, PU n performs scheduling of the shared channels for only those UEs 104 that span only the RUGs 2n and 2n+1 included in the RUG Group B for PU n. In connection with doing this, PU n retrieves the buffered user data and UE context for the scheduled UEs 104 from SU n and n+1. As shown in FIG. 3B, only UEs D, E, F, G, and H span only the RUGs 2n−1 and 2n included in RUG Group B. For the second time slot, PU n schedules border UE F because border UE F spans only those RUGs 2n and 2n+1 included in the RUG Group B but PU n does not schedule border UE C because border UE C spans both RUG 2n−1 and RUG 2n, the first of which is not included in RUG Group B. For the second time slot, the PU n also considers as candidates for being served in reuse any collection of UEs D, E, F, G, and H since the respective PZ of each UE D, E, F, G, and H does not overlap with the respective PZ of any of the other UEs D, E, F, G, and H.

The PZ for each UE 104 served by the base station 100 can be determined as described below in connection with FIG. 4.

Figure 4:
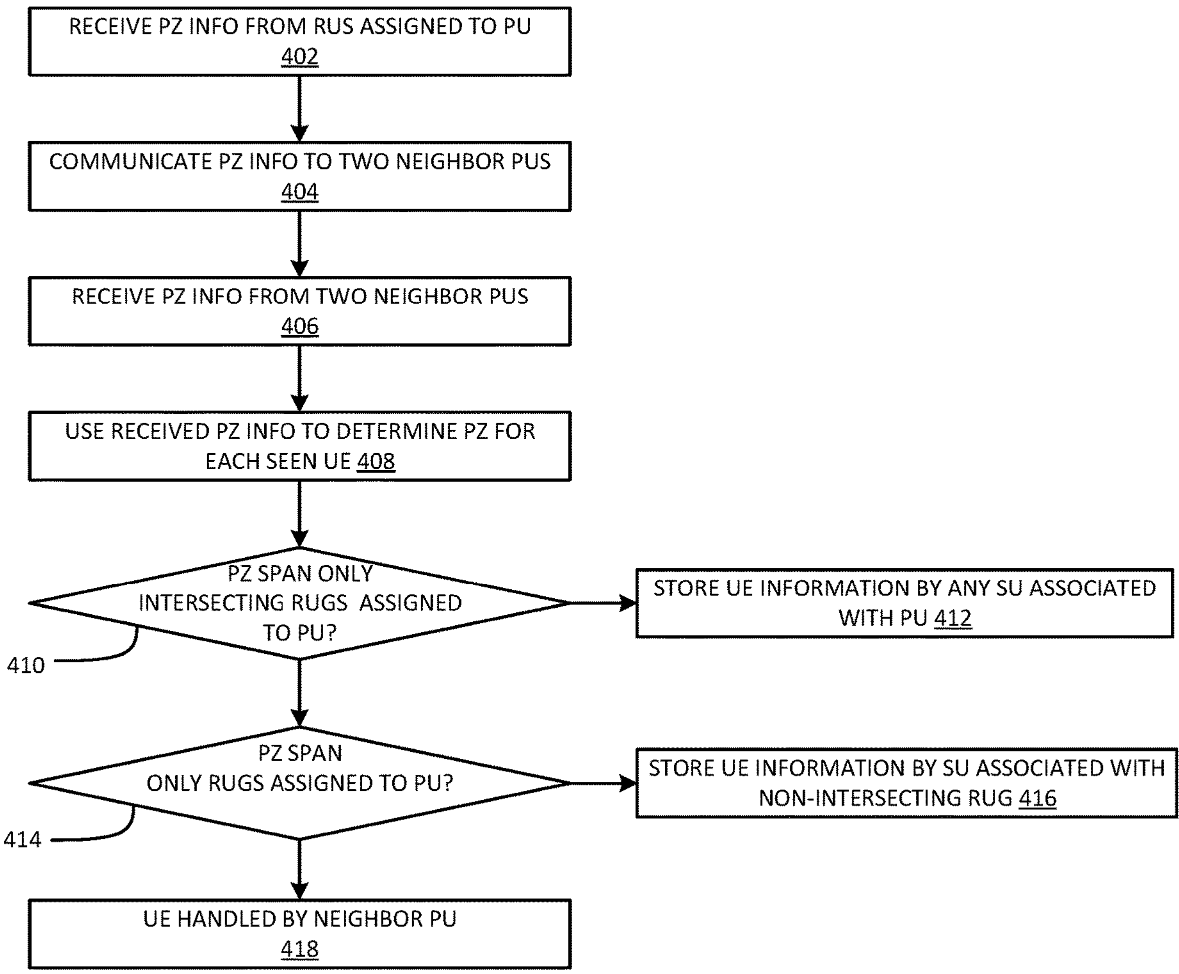
FIG. 4 comprises a high-level flowchart illustrating an exemplary embodiment of a method of determining the respective PZs for the UEs served by a base station.

FIG. 4 comprises a high-level flowchart illustrating an exemplary embodiment of a method 400 of determining the respective PZs for the UEs served by a base station 100. The embodiment of method 400 shown in FIG. 4 is described here as being implemented using the base station 100 of FIG. 1. However, it is to be understood that other embodiments can be implemented in other ways.

The blocks of the flow diagram shown in FIG. 4 have been arranged in a generally sequential manner for ease of explanation; however, it is to be understood that this arrangement is merely exemplary, and it should be recognized that the processing associated with method 400 (and the blocks shown in FIG. 4) can occur in a different order (for example, where at least some of the processing associated with the blocks is performed in parallel and/or in an event-driven manner). Also, most standard exception handling is not described for ease of explanation; however, it is to be understood that method 400 can and typically would include such exception handling. Moreover, one or more aspects of method 400 can be configurable or adaptive (either manually or in an automated manner).

In the exemplary embodiment described herein in connection with FIG. 4, method 400 is performed by each PU 112.

Method 400 comprises receiving, by each PU 112 from the RUs 110 assigned to that PU 112, PZ information generated by those RUs 110 (block 402). As used here, "PZ information" refers to the information generated by the RUs 110 that is used to determine the PZ for the various UEs 104. In the embodiments described here, the PZ information comprises information about any PRACH and SRS transmissions the RUs 110 are able to detect and measure. Each RU 110 communicates information about any PRACH and SRS transmissions it is able to detect and measure to the two PUs 112 assigned to that RU 110. That is, each RU 110 communicates the PZ information that it generates to the two PUs 112 assigned to that RU 110.

Each PU 112 is described here as being able to "see" any UE 104 for which that PU 112 receives PZ information from at least one RU 110 assigned to that PU 112. As noted above, the PZ for each UE 104 is determined based on the PZ information provided from the various RUs 110.

Each PU 112 communicates to that PU's two neighbor PUs 112, the PZ information that PU 112 receives from the RUs 110 assigned to it (block 404) and receives from that PU's two neighbor PUs 112, the PZ information the two neighbor PUs 112 receive from the RUs 110 assigned to them (block 406).

Method 400 further comprises, for each UE 104 that each PU 112 sees, using the respective PZ information received by the PU 112 for that UE 104 to determine the PZ for that UE 104 (block 408). Each PU 112 uses the respective PZ information received directly from the RUs 110 assigned to that PU 112 and any PZ information received for that UE 104 from its two neighbor PUs 112. In this embodiment, the respective PZ for each seen UE 104 is determined using the PRACH and SRS information received by the various RUs 110 as described above.

In the embodiments described here, at least two of the SUs 114 are assigned to each PU 112 for storing UE information (including, for example, buffered user data and UE contexts) for the UEs 104 being scheduled and served by that PU 112.

For each UE 104 that each PU 112 sees, if the respective PZ for that UE 104 spans only intersecting RUGs 128 assigned to the PU 112 (block 410), the respective UE information for that UE 104 is stored by any of the SUs 114 assigned to that PU 112 (block 412). As noted above, if the PZ for a UE 104 spans only the intersecting RUGs 128 of a PU 112, then that PU 112 will schedule and serve that UE 104 for both subsets of time slots.

Otherwise, the PU 112 determines if the respective PZ for a UE 104 spans only RUGs 128 assigned to that PU 112 (block 414). If that is the case, the respective PZ for the UE 104 will span only RUGs 128 included in one of the RUG Groups 130 assigned to that PU 112—either intersecting RUGs 128 and non-intersecting RUGs 128 from one RUG Group 130 assigned to the PU 112 or only non-intersecting RUGs 128 from one RUG Group 130 assigned to the PU 112. If that is the case, the respective UE information for that UE 104 is stored by a SU 114 associated with the RUG Group 130 spanned by the UE 104 (block 416).

As noted above, if the respective PZ for a UE 104 spans an intersecting RUG 128 assigned to a PU 112 and a non-intersecting RUG 128 from one RUG Group 130 assigned to that PU 112, then that PU 112 will schedule and serve that UE 104 for both subsets of time slots. Also, as noted above, each non-intersecting RUG 128 is assigned to two PUs 112, whereas each intersecting RUG 128 is assigned to one PU 112. If the respective PZ for a UE 104 spans an intersecting RUG 128 assigned to a PU 112 and a non-intersecting RUG 128 from one RUG Group 130 assigned to that PU 112, the UE information for that UE 104 will be stored by a SU 114 assigned to both that PU 112 and its neighbor PU 112 assigned to the non-intersecting RUG 128 spanned by the UE 104. As used here, a SU 114 is "associated with" a non-intersecting RUG 128 if that SU 114 is assigned to both of the PUs 112 assigned to that non-intersecting RUG 128.

As noted above, if the respective PZ for a UE 104 spans only non-intersecting RUGs 128 from one RUG Group 130 assigned to a PU 112, then that PU 112 will schedule and serve that UE 104 for one of the one time slot subsets and that PU's neighbor PU 112 that is also assigned to the non-intersecting RUGs 128 spanned by that UE 104 will schedule and serve that UE 104 for the other one of the time slot subsets. The UE information for that UE 104 will be stored by a SU 114 assigned to both that PU 112 and its neighbor PU 112 assigned to the non-intersecting RUGs 128 spanned by the UE 104.

Otherwise, if a PU 112 determines that the respective PZ for a UE 104 spans a RUG 128 that is not assigned to that PU 112, then that PU 112 does not schedule that UE 104 and, instead, that UE 104 is scheduled by that neighbor PU 112 (block 418). This will occur, for example, where the PZ for a UE 104 that spans one non-intersecting RUG 128 assigned to a PU 112 and one non-intersecting RUG 128 not assigned to that PU 112 but assigned to a neighbor PU 112. Given the constraints on the arrangement of the RUs 110 and the assignment of RUs 110 to RUGs 128 noted above, when this happens, both non-intersecting RUGs 128 will be assigned to the neighbor PU 112, which will handle that UE 104.

When the SU 114 storing the UE information for a given UE 104 changes from a first SU 114 to a second SU 114, the UE information for that UE 104 is transferred from the first SU 114 to the second SU 114. A degree of hysteresis can be introduced in order to avoid transfers of UE information between SU 114. The communication manager 116 can be configured to assist with this.

The operation of method 400 can be described in connection with the example shown in FIGS. 3A-3B. In this example, the UE information for UEs D and E can be stored by either SU n or SU n+1 since the respective PZs for UE D and E span only the intersecting RUG 2n assigned to PU n.

The UE information for UE C is stored by SU n since the PZ for UE C spans both intersecting RUG 2n and non-intersecting RUG 2n−1 and SU n is assigned to both PU n and PU n−1 (PU n−1 is the neighbor PU of PU n that is also assigned to non-intersecting RUG 2n−1). The UE information for UE F is stored by SU n+1 since the PZ for UE F spans both intersecting RUG 2n and non-intersecting RUG 2n+1 and SU n+1 is assigned to both PU n and PU n+1 (PU n+1 is the neighbor PU of PU n that is also assigned to non-intersecting RUG 2n+1).

The UE information for UEs A and B is stored by SU n since the respective PZs for UEs A and B span only non-intersecting RUG 2n−1 and SU n is assigned to both PU n and PU n−1 (PU n−1 is the neighbor PU of PU n that is also assigned to non-intersecting RUG 2n−1).

The UE information for UEs G and H is stored by SU n+1 since the respective PZs for UEs G and H span only non-intersecting RUG 2n+1 and SU n+1 is assigned to both PU n and PU n+1 (PU n+1 is the neighbor PU of PU n that is also assigned to non-intersecting RUG 2n+1).

In the embodiments described above, the border-free scheduling techniques are described as being used for the shared channel. It is to be understood, however, that these techniques could be used for channels other than just the shared channels.

In some embodiments, different techniques are used for the support channels (for example, the Physical Downlink Control Channel (PDCCH) and the Physical Uplink Control Channel (PUCCH)). One way of providing wireless service using one or more support channels of a wireless interface using the base station 100 of FIG. 1 is shown in FIG. 5.

Figure 5:
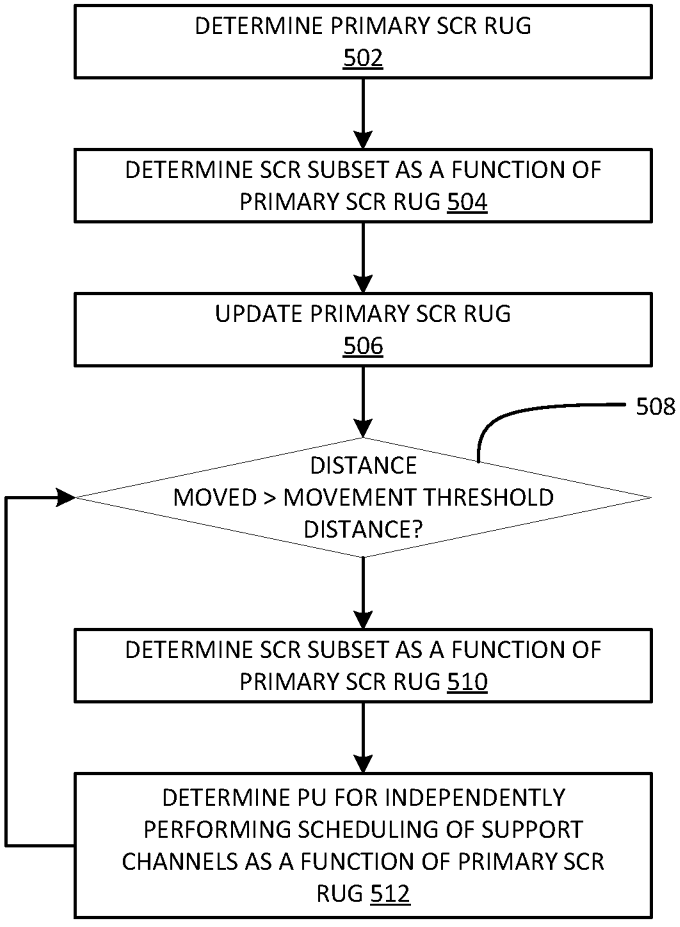
FIG. 5 comprises a high-level flowchart illustrating an exemplary embodiment of a method of providing wireless service using one or more support channels of a wireless interface.

FIG. 5 comprises a high-level flowchart illustrating an exemplary embodiment of a method 500 of providing wireless service using one or more support channels of a wireless interface. The embodiment of method 500 shown in FIG. 5 is described here as being implemented using the base station 100 of FIG. 1. However, it is to be understood that other embodiments can be implemented in other ways.

The blocks of the flow diagram shown in FIG. 5 have been arranged in a generally sequential manner for ease of explanation; however, it is to be understood that this arrangement is merely exemplary, and it should be recognized that the processing associated with method 500 (and the blocks shown in FIG. 5) can occur in a different order (for example, where at least some of the processing associated with the blocks is performed in parallel and/or in an event-driven manner). Also, most standard exception handling is not described for ease of explanation; however, it is to be understood that method 500 can and typically would include such exception handling. Moreover, one or more aspects of method 500 can be configurable or adaptive (either manually or in an automated manner).

In the exemplary embodiment described herein in connection with FIG. 5, method 500 is performed by each PU 112 independently of the other PUs 112 and is performed for the PDCCH and PUCCH.

With method 500, the resources provided by the support channels are divided into two non-intersecting subsets. In the exemplary embodiment described here in connection with FIG. 5, each RUG 128 is assigned to one of the support channel resource (SCR) subsets. This is done so that there is a minimum distance between RUGs 128 assigned to the same SCR subset.

Each RU 110 is assigned to a RU Group for the purposes of scheduling the support channels. Each such RU Group 150 is also referred to here as a "SCR RUG" 150. It is noted that the SCR RUGs 150 used for support channel scheduling need not be the same as the RUGs 130 used for shared channel scheduling (though the SCR RUGs 150 can be the same as the RUGs 130 used for shared channel scheduling).

Method 500 comprises determining a primary SCR RUG 150 for each UE 104 (block 502). The primary SCR RUG 150 for a given UE 104 can be determined by summing the received signal strength for the PRACH or SRS transmission from that UE 104 as received by all of the RUs 110 included in each SCR RUG 150 and then identifying which SCR RUG 150 has the highest sum. The primary RUG 150 can be determined each time the PZ for a UE 104 is updated and can be determined by any PU 112 that determines the PZ for the UE 104.

When UE 104 has not been assigned a SCR subset, a SCR subset is assigned to the UE 104 as a function of the primary SCR RUG 150 for that UE 104 (block 504).

As noted above, as the UE 104 moves throughout the coverage area of the cell 102, its primary SCR RUG 150 will be updated to reflect any change in the location of the UE 104 (block 506).

When the distance a UE 104 has moved since the last time the SCR subset assigned to that UE 104 changed is greater than a predetermined movement threshold distance (block 508), a SCR subset is assigned to the UE 104 as a function of the primary SCR RUG 150 for that UE 104 (block 510) and a PU 112 is assigned to that UE 104 for independently performing scheduling of the support channels for that UE 104 as a function of the primary SCR RUG 150 for that UE 104 (block 512). In this embodiment, the distance a UE 104 moves is determined by counting the number of SCR RUGs 150 the UE 104 between the current primary SCR RUG 150 for the UE 104 and the primary SCR RUG 150 for the UE 104 when the SCR subset assigned to that UE 104 last changed. The predetermined movement threshold distance can be selected in order to introduce a degree of hysteresis in order to avoid frequent reassignments of SCR subsets for a UE 104.

Figure 6:
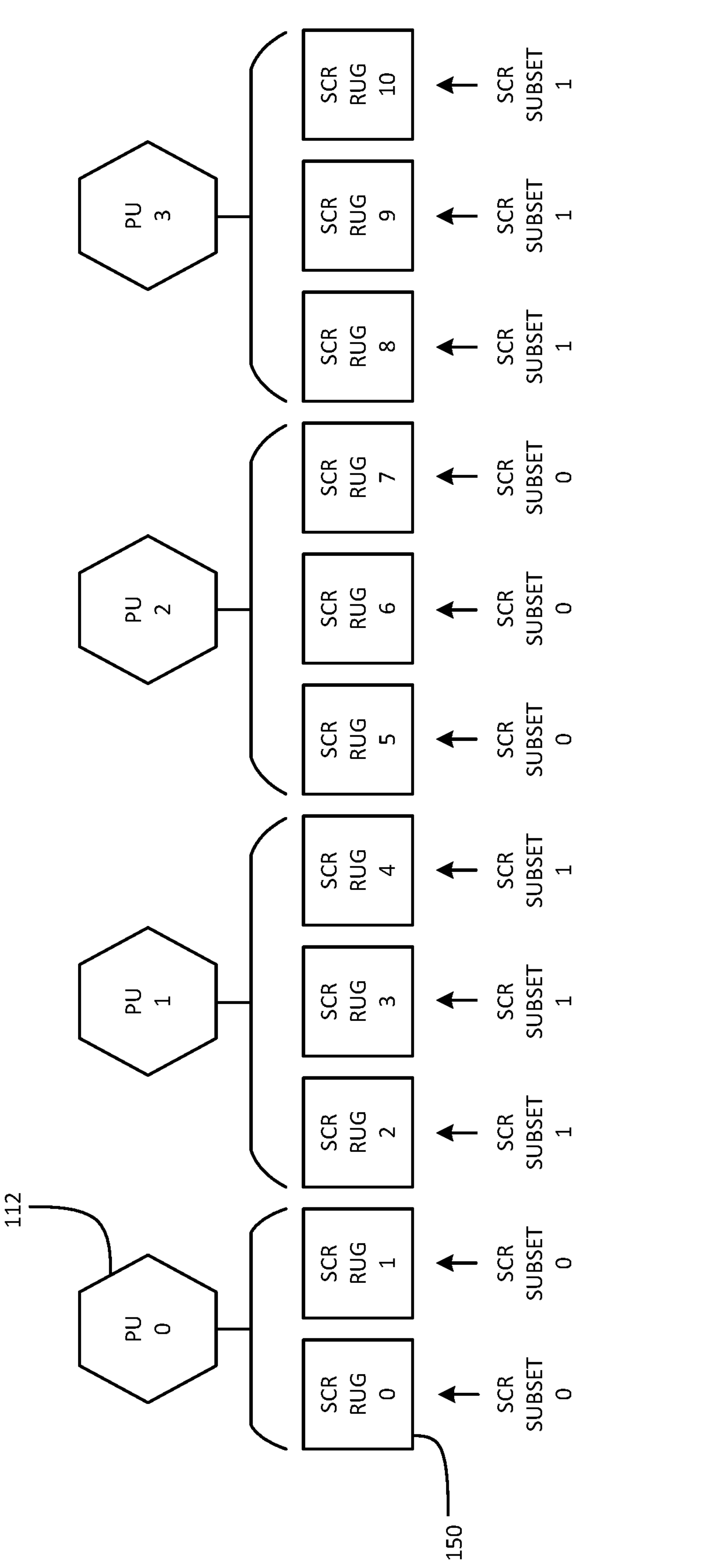
FIG. 6 is a block diagram illustrating a portion of the example shown in FIG. 1.

One example of the operation of method 500 is illustrated in connection with FIG. 6. FIG. 6 is a block diagram illustrating a portion of the example shown in FIG. 1. More specifically, in FIG. 1, SCR RUGs 0, 1, 2, 3, 4, 5, 6, 7, 8, 9, and 10 are shown. Although the SCR RUGs are arranged in a line in the example shown in FIG. 6, the techniques described here can be extended to two or three dimensions (for example, with a square or cube layout of SCR RUGs) in a straightforward manner.

In this example, SCR subsets are assigned as function of the primary SCR RUG 150 determined for a UE 104 by using the following formula:

$$s = \text{modulo}\left(\text{round}\left(\frac{n_p}{d}\right), 2\right)$$

where s is the assigned support channel subset (0 or 1), np is the reference number of the SCR RUG 150, and dis the minimum distance between SCR RUGs 150 assigned to the same SCR subset. FIG. 6 illustrates the SCR subset assignments made using this formula where the minimum distance dis equal to 3 SCR RUGs. That is, SCR RUGs 0, 1, 5, 6, and 7 are assigned SCR subset 0, and SCR RUGs 2, 3, 4, 8, 9, and 10 are assigned SCR subset 1.

In this example, PU 0 is assigned to SCR RUGs 0, 1, PU 1 is assigned to SCR RUGs 2, 3, 4, PU 3 is assigned to SCR RUGs 5, 6, 7, and PU 4 is assigned to SCR RUGs 8, 9, and 10.

In the example shown in FIG. 6, when the primary SCR RUG 150 for a UE 104 has changed by a distance greater than a predetermined movement threshold distance of 1 SCR RUG since the SCR subset assigned to that UE 104 last changed, a SCR subset assignment is determined as a function of the primary SCR RUG np for that UE 104 using the formula set forth above. In this way, a degree of hysteresis is introduced in order to avoid frequent reassignments of SCR subsets for a UE 104.

For example, when a UE 104 initially has a primary SCR RUG 150 of RUG 4, the UE 104 is initially assigned SCR subset 1 and PU 1 for independently performing scheduling of the support channels for that UE 104. When the UE 104 moves to the right so that the primary SCR RUG 150 for that UE 104 is now RUG 5, the distance the UE 104 has moved is equal to 1 SCR RUG, which is equal to (but not greater than) the movement threshold distance of 1 SCR RUG and the SCR subset assigned to that UE 104 is not updated even though the primary SCR RUG 150 for the UE 104 is one that is assigned SCR subset 0. Also, PU 1 continues to be assigned to that UE 104 for independently performing scheduling of the support channels for that UE 104. The configuration of the SCR RUGs 150 is such that the minimum distance d noted above between the new primary SCR RUG 5 and any other SCR RUG 150 assigned to SCR subset 1 is still maintained.

When the UE 104 moves further to the right so that the primary SCR RUG 150 for that UE 104 is now SCR RUG 6, the distance the UE 104 has moved is now equal to 2 SCR RUGs, which is greater than the movement threshold distance of 1 SCR RUG and the SCR subset assigned to that UE 104 is updated and the UE 104 is assigned SCR subset 0. Also, PU 2 is assigned to that UE 104 for independently performing scheduling of the support channels for that UE 104.

By performing support-channel scheduling in a way that supports reuse, additional RUs 110 and connected UEs can be served by a single base station 100 using a single cell relative to conventional C-RANs that do not support reuse for support channels.

As noted above the SCR RUGs used for support channel scheduling need not be the same as the RUGs used for shared channel scheduling. The support channels (particularly PUCCH) are typically more robust to interference than the shared channels PDSCH and PUSCH. SCR RUGs having a smaller size than the RUGs used for shared channel scheduling can be used for support channel scheduling. Moreover, for deployments in which large RUG size is required to support border-free scheduling of the shared channels as described above (assuming the same RUGs used for shared channel scheduling are also used for support channel resource scheduling) or where the value for minimum distance dis relatively large, these factors may limit the density of connected UEs 104. If so, transmit power reduction along with reduced spacing between RUs 110 may overcome this limitation.

As noted above, the techniques described here can be extended to two or three dimensions (for example, with a square or cube layout of RUGs and/or SCR RUGs) in a straightforward manner.

Other embodiments can be implemented in other ways.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

EXAMPLE EMBODIMENTS

Example 1 includes a system comprising: a distributed unit (DU) comprising a plurality of processing units (PUs); and a plurality of radio units (RUs) to wirelessly transmit and receive radio frequency signals to and from a plurality of user equipment (UEs) using a wireless interface, the wireless interface using a plurality of time slots, each of the RUs associated with a respective set of antennas; wherein the PUs are communicatively coupled to the plurality of RUs over a fronthaul network; wherein each of the RUs is assigned to one of a plurality of RU groups (RUGs) for the purposes of scheduling at least one shared channel; wherein the system is configured to determine a respective protection zone (PZ) for each UE, the respective protection zone for each UE comprising a respective signal zone (SZ) comprising a respective first subset of the RUs used to wirelessly communicate with that UE using the at least one shared channel, the respective PZ for each UE further comprising a respective second subset of the remote units that are not used to wirelessly communicate with any other UE using the at least one shared channel while the RUs in the respective SZ for that UE are being used to wirelessly communicate with that UE using the at least one shared channel; wherein the respective PZ associated with each UE spans each RUG having at least one RU that is included in that PZ; wherein each PU is associated with a respective pair of overlapping groupings of RUGs (RUG Groups); wherein the RUs are deployed and assigned to the RUGs so that: includes the respective PZ determined for each UE cannot span more than two RUGs; the respective no more than two RUGs spanned by each UE are collectively associated with no more than two PUs; a respective intersection of the respective pair of RUG Groups associated with each PU includes at least one RUG; each of the respective pair of RUG Groups associated with each PU includes at least one RUG that is not in the respective intersection of the respective pair of RUG Groups associated with that PU; and each RUG that is not in the respective intersection of the respective pair of RUG Groups associated with each PU is included in one of the respective pair of RUG Groups associated with a neighbor PU of that PU and is not included in the respective intersection of the respective pair of RUG Groups associated with that neighbor PU; and wherein each PU is configured to: for each time slot included in a first subset of the time slots, independently perform scheduling for the at least one shared channel for only those UEs for which the respective PZs span only the RUGs included in a first one of the respective pair of RUG Groups associated with that PU; for each time slot included in a second subset of the time slots, independently perform scheduling for the at least one shared channel for only those UEs for which the respective PZs span only the RUGs included in a second one of the respective pair of RUG Groups associated with that PU; and for each time slot, serve each UE allocated resources to the at least one shared channel for that time slot by that PU. As noted above, the techniques described here can be extended to two or three dimensions (for example, with a square or cube layout of RUGs) in a straightforward manner.

Example 2 includes the system of Example 1, wherein the first and second subsets of the time slots comprise first and second halves of the time slots, respectively.

Example 3 includes the system of any of Examples 1-2, wherein the respective PZ and SZ for each UE is determined by the respective PUs associated with the RUs that are able to wirelessly communicate with that UE.

Example 4 includes the system of Example 3, wherein the respective PZ and SZ for each UE is determined by the respective PUs associated with the RUs that are able to wirelessly receive at least one a Physical Random Access Channel (PRACH) and Sounding Reference Signal (SRS) transmissions from that UE.

Example 5 includes the system of any of Examples 1-4, wherein each PU is configured to consider as candidates for being served in reuse during each time slot any collection of UEs for which that PU is performing scheduling during that time slot for which the respective PZ of each UE in that collection does not overlap with the respective PZ of any other UE included in that collection.

Example 6 includes the system of Example 5, wherein each PU is configured to independently assign different precoders to each RU included in the respective SZ of each UE included in a collection of UEs being served in reuse during any time slot so as to suppress interference at the other UEs included the collection of UEs being served in reuse during that time slot.

Example 7 includes the system of any of Examples 1-6, wherein the RUs are deployed so that each of the respective pairs of RUG Groups associated with each PU comprises an N×N array of RUGs.

Example 8 includes the system of Example 7, wherein the RUs are deployed so that each of the respective pairs of RUG Groups associated with each PU comprises an 1×2 array of RUGs.

Example 9 includes the system of any of Examples 1-8, wherein the system is configured so that a respective subset of PUs performing scheduling for each UE is updated and changed to reflect movement of that UE.

Example 10 includes the system of Example 9, wherein the DU further comprises a plurality of storage units (SU) configured to store buffered user data and UE contexts for the UEs.

Example 11 includes the system of Example 10, wherein each PU is configured to coordinate with the respective neighbor PUs of that PU to determine which SU to store buffered user data and UE context for each UE seen by that PU.

Example 12 includes the system of Example 11, wherein the system is configured so that which SU stores the user data and UE context for each UE is updated and changed to reflect movement of that UE.

Example 13 includes the system of Example 12, wherein for each UE, the system is configured to, in response to an update that causes a different subset of PUs to perform scheduling for that UE, use a SU associated with that different subset of PUs to store the user data and UE context for that UE.

Example 14 includes the system of Example 13, wherein for each UE, the system is configured to, in response to an update that causes a different SU to store the user data and UE context for that UE, move the user data and UE context for that UE to that different SU.

Example 15 includes the system of Example 14, further comprising a central unit (CU) and a communication manager that is configured to communicatively couple the CU to the PUs and SUs of the DU, wherein the communication manager is configured to route data associated with the UEs between the CU and the PUs and SUs serving those UEs and to move the user data and UE contexts for the UEs to the SUs used for storing the user data and UE contexts for the UEs.

Example 16 includes the system of any of Examples 1-15, wherein the at least one shared channel comprises at least one of a Physical Downlink Shared Channel (PDSCH) and a Physical Uplink Shared Channel (PUSCH).

Example 17 includes the system of any of Examples 1-16, wherein the support channel resources (SCRs) provided by at least one support channel of the wireless interface are divided into two SCR subsets; wherein each of the RUs is assigned to one of a plurality of SCR RUGs for the purposes of scheduling the at least one support channel; wherein each UE is associated with a respective single primary SCR RUG spanned by that UE, the respective primary SCR RUG for each UE is the SCR RUG that includes the RU having a highest signal reception associated with that UE; wherein each SCR RUG is associated with at least one of the SCR subsets; and wherein each UE is allocated a resource from a respective one of the SCR subsets as a function of the respective primary SCR RUG for that UE; and wherein the system is configured so that when any UE is scheduled to use any SCR included in a first one of the SCR subsets there is a minimum number of neighboring SCR RUGs between the respective primary SCR RUG of that UE and any other SCR RUG associated with said first one of the SCR subsets.

Example 18 includes the system of Example 17, wherein each PU is associated with a respective subset of neighboring SCR RUGs and is configured to schedule, for SCRs, each UE having a primary SCR RUG that is included in the subset of neighboring SCR RUGs associated with that PU.

Example 19 includes the system of any of Examples 17-18, wherein the respective one of the SCR subsets assigned to each UE is updated as the respective primary SCR RUG associated with that UE changes as that UE moves.

Example 20 includes the system of Example 19, wherein the respective one of the SCR subsets assigned to each UE is updated with hysteresis as the respective primary SCR RUG associated with that UE changes as that UE moves.

Example 21 includes the system of any of Examples 17-20, where the SCR RUGs used for the purposes of scheduling the at least one support channel are the same as the RUGs used for the purposes of scheduling the at least one shared channel.

Example 22 includes the system of any of Examples 17-20, where the SCR RUGs used for the purposes of scheduling the at least one support channel differ from the RUGs used for the purposes of scheduling the at least one shared channel.

Example 23 includes the system of any of Examples 17-22, wherein the at least one support channel comprises at least one of a Physical Downlink Control Channel (PDCCH) and a Physical Uplink Control Channel (PUCCH).

Example 24 includes system comprising: a distributed unit (DU) comprising a plurality of processing units (PUs); and a plurality of radio units (RUs) to wirelessly transmit and receive radio frequency signals to and from a plurality of user equipment (UEs) using a wireless interface, the wireless interface using a plurality of time slots, each of the RUs associated with a respective set of antennas; wherein the PUs are communicatively coupled to the plurality of RUs over a fronthaul network; wherein support channel resources (SCR) provided by the at least one support channel of the wireless interface are divided into two SCR subsets; wherein each of the RUs is assigned to one of a plurality of SCR RU groups (RUGs) for the purposes of scheduling the at least one support channel; wherein each UE comprises a respective primary SCR RUG spanned by that UE, the respective primary SCR RUG for each UE comprises the SCR RUG that includes the RU having a highest signal reception associated with that UE; wherein each SCR RUG is associated with at least one of the SCR subsets; wherein each UE is assigned a respective one of the SCR subsets as a function of the respective primary SCR RUG for that UE; and wherein the system is configured so that when any UE is scheduled to use any SCR included in a first one of the SCR subsets there is a minimum number of neighboring SCR RUGs between the respective primary SCR RUG of that UE and any other SCR RUG associated with said first one of the SCR subsets. As noted above, the techniques described here can be extended to two or three dimensions (for example, with a square or cube layout of SCR RUGs) in a straightforward manner.

Example 25 includes the system of Example 24, wherein each PU is associated with a respective subset of neighboring SCR RUGs and is configured to schedule, for SCRs, each UE having a primary SCR RUG that is included in the subset of neighboring SCR RUGs associated with that PU.

Example 26 includes the system of any of Examples 24-25, wherein the respective one of the SCR subsets assigned to each UE is updated as the respective primary SCR RUG associated with that UE changes as that UE moves.

Example 27 includes the system of Example 26, wherein the respective one of the SCR subsets assigned to each UE is updated as the respective primary SCR RUG associated with that UE changes as that UE moves with hysteresis.

Example 28 includes the system of any of Examples 24-27, where the SCR RUGs used for the purposes of scheduling the at least one support channel are the same as the RUGs used for the purposes of scheduling the at least one shared channel.

Example 29 includes the system of any of Examples 24-28, where the SCR RUGs used for the purposes of scheduling the at least one support channel differ from the RUGs used for the purposes of scheduling the at least one shared channel.

Example 30 includes the system of any of Examples 24-29, wherein the at least one support channel comprises at least one of a Physical Downlink Control Channel (PDCCH) and a Physical Uplink Control Channel (PUCCH).

What is claimed is:

1. A system comprising:

a distributed unit (DU) comprising a plurality of processing units (PUs); and a plurality of radio units (RUs) to wirelessly transmit and receive radio frequency signals to and from a plurality of user equipment (UEs) using a wireless interface, the wireless interface using a plurality of time slots, each of the RUs associated with a respective set of antennas;

wherein the PUs are communicatively coupled to the plurality of RUs over a fronthaul network;

wherein each of the RUs is assigned to one of a plurality of RU groups (RUGs) for the purposes of scheduling at least one shared channel;

wherein the system is configured to determine a respective protection zone (PZ) for each UE, the respective protection zone for each UE comprising a respective signal zone (SZ) comprising a respective first subset of the RUs used to wirelessly communicate with that UE using the at least one shared channel, the respective PZ for each UE further comprising a respective second subset of the radio units that are not used to wirelessly communicate with any other UE using the at least one shared channel while the RUs in the respective SZ for that UE are being used to wirelessly communicate with that UE using the at least one shared channel;

wherein the respective PZ associated with each UE spans each RUG having at least one RU that is included in that PZ;

wherein each PU is associated with a respective pair of overlapping groupings of RUGs (RUG Groups);

wherein the RUs are deployed and assigned to the RUGs so that:

the respective PZ determined for each UE cannot span more than two RUGs; the respective no more than two RUGs spanned by each UE are collectively associated with no more than two PUs;

a respective intersection of the respective pair of RUG Groups associated with each PU includes at least one RUG;

each of the respective pair of RUG Groups associated with each PU includes at least one RUG that is not in the respective intersection of the respective pair of RUG Groups associated with that PU; and each RUG that is not in the respective intersection of the respective pair of RUG Groups associated with each PU is included in one of the respective pair of RUG Groups associated with a neighbor PU of that PU and is not included in the respective intersection of the respective pair of RUG Groups associated with that neighbor PU; and wherein each PU is configured to:

for each time slot included in a first subset of the time slots, independently perform scheduling for the at least one shared channel for only those UEs for which the respective PZs span only the RUGs included in a first one of the respective pair of RUG Groups associated with that PU;

for each time slot included in a second subset of the time slots, independently perform scheduling for the at least one shared channel for only those UEs for which the respective PZs span only the RUGs included in a second one of the respective pair of RUG Groups associated with that PU; and for each time slot, serve each UE allocated resources to the at least one shared channel for that time slot by that PU.

2. The system of claim 1, wherein the first and second subsets of the time slots comprise first and second halves of the time slots, respectively.

3. The system of claim 1, wherein the respective PZ and SZ for each UE is determined by the respective PUs associated with the RUs that are able to wirelessly communicate with that UE.

4. The system of claim 3, wherein the respective PZ and SZ for each UE is determined by the respective PUs associated with the RUs that are able to wirelessly receive at least one a Physical Random Access Channel (PRACH) and Sounding Reference Signal (SRS) transmissions from that UE.

5. The system of claim 1, wherein each PU is configured to consider as candidates for being served in reuse during each time slot any collection of UEs for which that PU is performing scheduling during that time slot for which the respective PZ of each UE in that collection does not overlap with the respective PZ of any other UE included in that collection.

6. The system of claim 5, wherein each PU is configured to independently assign different precoders to each RU included in the respective SZ of each UE included in a collection of UEs being served in reuse during any time slot so as to suppress interference at the other UEs included the collection of UEs being served in reuse during that time slot.

7. The system of claim 1, wherein the RUs are deployed so that each of the respective pairs of RUG Groups associated with each PU comprises an N×N array of RUGs.

8. The system of claim 7, wherein the RUs are deployed so that each of the respective pairs of RUG Groups associated with each PU comprises an 1×2 array of RUGs.

9. The system of claim 1, wherein the system is configured so that a respective subset of PUs performing scheduling for each UE is updated and changed to reflect movement of that UE.

10. The system of claim 9, wherein the DU further comprises a plurality of storage units (SU) configured to store buffered user data and UE contexts for the UEs.

11. The system of claim 10, wherein each PU is configured to coordinate with the respective neighbor PUs of that PU to determine which SU to store buffered user data and UE context for each UE seen by that PU.

12. The system of claim 11, wherein the system is configured so that which SU stores the user data and UE context for each UE is updated and changed to reflect movement of that UE.

13. The system of claim 12, wherein for each UE, the system is configured to, in response to an update that causes a different subset of PUs to perform scheduling for that UE, use a SU associated with that different subset of PUs to store the user data and UE context for that UE.

14. The system of claim 13, wherein for each UE, the system is configured to, in response to an update that causes a different SU to store the user data and UE context for that UE, move the user data and UE context for that UE to that different SU.

15. The system of claim 14, further comprising a central unit (CU) and a communication manager that is configured to communicatively couple the CU to the PUs and SUs of the DU, wherein the communication manager is configured to route data associated with the UEs between the CU and the PUs and SUs serving those UEs and to move the user data and UE contexts for the UEs to the SUs used for storing the user data and UE contexts for the UEs.

16. The system of claim 1, wherein the at least one shared channel comprises at least one of a Physical Downlink Shared Channel (PDSCH) and a Physical Uplink Shared Channel (PUSCH).

17. The system of claim 1, wherein the support channel resources (SCRs) provided by at least one support channel of the wireless interface are divided into two SCR subsets;

wherein each of the RUs is assigned to one of a plurality of SCR RUGs for the purposes of scheduling the at least one support channel;

wherein each UE is associated with a respective single primary SCR RUG spanned by that UE, the respective primary SCR RUG for each UE is the SCR RUG that includes the RU having a highest signal reception associated with that UE;

wherein each SCR RUG is associated with at least one of the SCR subsets; and wherein each UE is allocated a resource from a respective one of the SCR subsets as a function of the respective primary SCR RUG for that UE; and wherein the system is configured so that when any UE is scheduled to use any SCR included in a first one of the SCR subsets there is a minimum number of neighboring SCR RUGs between the respective primary SCR RUG of that UE and any other SCR RUG associated with said first one of the SCR subsets.

18. The system of claim 17, wherein each PU is associated with a respective subset of neighboring SCR RUGs and is configured to schedule, for SCRs, each UE having a primary SCR RUG that is included in the subset of neighboring SCR RUGs associated with that PU.

19. The system of claim 17, wherein the respective one of the SCR subsets assigned to each UE is updated as the respective primary SCR RUG associated with that UE changes as that UE moves.

20. The system of claim 19, wherein the respective one of the SCR subsets assigned to each UE is updated with hysteresis as the respective primary SCR RUG associated with that UE changes as that UE moves.

21. The system of claim 17, where the SCR RUGs used for the purposes of scheduling the at least one support channel are the same as the RUGs used for the purposes of scheduling the at least one shared channel.

22. The system of claim 17, where the SCR RUGs used for the purposes of scheduling the at least one support channel differ from the RUGs used for the purposes of scheduling the at least one shared channel.

23. The system of claim 17, wherein the at least one support channel comprises at least one of a Physical Downlink Control Channel (PDCCH) and a Physical Uplink Control Channel (PUCCH).

24. A system comprising:

a distributed unit (DU) comprising a plurality of processing units (PUs); and a plurality of radio units (RUs) to wirelessly transmit and receive radio frequency signals to and from a plurality of user equipment (UEs) using a wireless interface, the wireless interface using a plurality of time slots, each of the RUs associated with a respective set of antennas;

wherein the PUs are communicatively coupled to the plurality of RUs over a fronthaul network;

wherein support channel resources (SCR) provided by the at least one support channel of the wireless interface are divided into two SCR subsets;

wherein each of the RUs is assigned to one of a plurality of SCR RU groups (RUGs) for the purposes of scheduling the at least one support channel;

wherein each UE comprises a respective primary SCR RUG spanned by that UE, the respective primary SCR RUG for each UE comprises the SCR RUG that includes the RU having a highest signal reception associated with that UE;

wherein each SCR RUG is associated with at least one of the SCR subsets;

wherein each UE is assigned a respective one of the SCR subsets as a function of the respective primary SCR RUG for that UE; and wherein the system is configured so that when any UE is scheduled to use any SCR included in a first one of the SCR subsets there is a minimum number of neighboring SCR RUGs between the respective primary SCR RUG of that UE and any other SCR RUG associated with said first one of the SCR subsets.

25. The system of claim 24, wherein each PU is associated with a respective subset of neighboring SCR RUGs and is configured to schedule, for SCRs, each UE having a primary SCR RUG that is included in the subset of neighboring SCR RUGs associated with that PU.

26. The system of claim 24, wherein the respective one of the SCR subsets assigned to each UE is updated as the respective primary SCR RUG associated with that UE changes as that UE moves.

27. The system of claim 26, wherein the respective one of the SCR subsets assigned to each UE is updated as the respective primary SCR RUG associated with that UE changes as that UE moves with hysteresis.

28. The system of claim 24, where the SCR RUGs used for the purposes of scheduling the at least one support channel are the same as the RUGs used for the purposes of scheduling at least one shared channel.

29. The system of claim 24, where the SCR RUGs used for the purposes of scheduling the at least one support channel differ from the RUGs used for the purposes of scheduling at least one shared channel.

30. The system of claim 24, wherein the at least one support channel comprises at least one of a Physical Downlink Control Channel (PDCCH) and a Physical Uplink Control Channel (PUCCH).

* * * * *